United States Patent [19]
Cox et al.

[11] Patent Number: 5,137,790
[45] Date of Patent: Aug. 11, 1992

[54] POLYESTER/POLYESTERAMIDE BLENDS

[75] Inventors: A. James Cox, Kingsport; Linda C. Sand, Jonesborough; Michael S. Knight; Candace M. Stipe, both of Kingsport, all of Tenn.

[73] Assignee: Eastman Kodak Company, Rochester, N.Y.

[21] Appl. No.: 583,534

[22] Filed: Sep. 17, 1990

[51] Int. Cl.$^5$ .................... C08L 67/02; C08L 77/12; B32B 27/08; B32B 27/36
[52] U.S. Cl. ................................ 428/475.2; 428/480; 525/425
[58] Field of Search ...................... 525/425; 428/475.2

[56] References Cited

U.S. PATENT DOCUMENTS 4,501,781 2/1985 Kushida .................... 428/35
4,501,879 2/1985 Barbee et al. ............. 528/288

Primary Examiner—Patricia A. Short
Attorney, Agent, or Firm—John F. Stevens; William P. Heath, Jr.

[57] ABSTRACT

Disclosed are polymer blends, and articles made from such blends, of polyesteramides and polyesters or copolyesters. The polymer blends are useful in forming coinjection molded or coextruded structures with polyesters.

4 Claims, No Drawings

POLYESTER/POLYESTERAMIDE BLENDS

TECHNICAL FIELD

This invention relates to blends of polyesters with polyesteramides which have been found to be useful in the production of multilayered containers. These blends have good drying and processing characteristics and can be used as barrier materials to produce opaque or clear containers.

BACKGROUND OF THE INVENTION

Certain polyesteramides are high oxygen barrier materials useful in many food and beverage packaging applications. Very often, polyesteramides are used to form a barrier layer in multilayered containers produced by either coinjection or coextrusion processes with other polymers such as polyesters, in particular, poly(ethylene terephthalate) (PET). Polyesteramides have good adhesion to PET in these applications, but the melt viscosity match is very poor and often results in poor distribution of the barrier layer in the coinjected part on the coextruded sheet. Also, polyesteramides have glass transition temperatures which make it extremely difficult to dry.

It has been found that blends of selected polyesters with selected polyesteramides can be used to provide barrier layer materials that have improved drying properties and an improved melt viscosity match with PET resulting in improved processing for coinjection and coextrusion operations. Also, the improvement in processing has been found to be related to the method of making the polyesteramide/polyester melt blends. In addition, it has been found that blends of certain polyesteramides with glycol-modified PET can be coinjected and blow molded at conditions which will show improved clarity compared to PET/polyesteramide blends.

Of interest in connection with this invention is U.S. Pat. No. 4,501,879 which describes polyesteramides useful in this invention.

DESCRIPTION OF THE INVENTION

According to the present invention, there are provided blends of certain polyesteramides with certain polyesters and copolyesters, the blends comprising:

I. about 15-70 wt. % polyesteramide which is the reaction product of
 (A) a diamine having 2 to 20 carbon atoms;
 (B) a diol containing up to 24 carbon atoms; and
 (C) a dicarboxylic acid component consisting essentially of
  (i) about 5 to about 100 mole percent of a first, heteroatom-containing dicarboxylic acid of the formula
  $HO_2CCH_2X(RX)_yCH_2CO_2H$ wherein X represents $-O-$, $-S-$, or

y is 0 or 1, and R represents an aromatic moiety comprising 6 to about 24 carbon atoms, and (ii) 0 to about 95 mole percent of a second dicarboxylic acid containing up to 24 carbon atoms, wherein component (A) comprises about 10 to 90 mole percent of the total of components (A) and (B) in said polyesteramide, and II. about 85-30 wt % polyester or copolyester selected from poly(ethylene terephthalate) and poly(ethylene terephthalate) modified with up to about 70 mol % of a glycol selected from diethylene glycol, butanediol, hexanediol, and 1,4-cyclohexanedimethanol or mixtures of these copolyesters with poly(ethylene terephthalate).

The polyesters and copolyesters can be prepared by direct condensation of terephthalic acid with ethylene glycol (and modifying glycol, if used) or ester interchange using dimethyl terephthalate. The essential components of the polyester, e.g., terephthalic acid, or dimethyl terephthalate and ethylene glycol are commercially available.

The polyesters and copolyesters described above should have an I.V. (inherent viscosity) of from about 0.5 to about 1.0. The term "polyester" is sometimes used herein to include copolyesters as described above.

The polyesteramides comprise the reaction product of a diamine component, a diol component, and a dicarboxylic acid component. The diamine component comprises at least one diamine having 2 to 20 carbon atoms. The diamine can be either aliphatic or aromatic. The aliphatic diamines can contain aromatic moieties as long as such aromatic moieties are separated from the amino groups by at least one methylene ($-CH_2-$) group. Thus, examples of suitable aliphatic diamines include 1,2.ethylenediamine, 1,3-propylenediamine, 1,6-hexylenediamine, 1,12.dodecylenediamine, piperazine, 1,4-cyclohexanebismethylamine, p-xylylenediamine, m-xylylenediamine, mixtures thereof, etc.

The aromatic diamines are represented by such compounds as m-phenylenediamine, p-phenylenediamine, methylenebisaniline, the isomeric toluenediamines, the isomeric naphthalenediamines, mixtures thereof, etc. Preferred aromatic diamines are m-phenylenediamine, p-phenylenediamine, and mixtures thereof.

Of all of the diamines specifically mentioned above, preferred diamines include m-phenylenediamine, p-phenylenediamine, 1,6-hexylenediamine, piperazine, m-xylylenediamine, p-xylylenediamine, mixtures thereof, etc.

The polyesteramides further comprise a diol component. The diol component comprises at least one diol containing up to 24 carbon atoms. For example, the diol component may comprise an aliphatic glycol, preferably containing up to about 12 carbon atoms. Examples of such compounds include ethylene glycol, propylene glycol, 2,4-butanediol, neopentyl glycol, 1,6-hexanediol, 1,2-cyclohexanedimethanol, 1,3-cyclohexanedimethanol, 1,4-cyclohexanedimethanol, diethylene glycol, mixtures thereof, etc. The diol component preferably comprises ethylene glycol, 1,4-butanediol, or 1,4-cyclohexanedimethanol, and more preferably comprises ethylene glycol or 1,4-butanediol. Most preferably, the diol component comprises ethylene glycol. Additionally, minor amounts (i.e., less than about 50 mole percent, and, preferably, less than about 10 mole percent, based on the total amount of diol present in the polyesteramide) of other known polyester-forming glycols may also be employed. Such diols may include, for example, 2,4-dimethyl-2-ethylhexane-1,3-diol; 2-ethyl-2-butyl-1,3-propanediol; 2-ethyl-2-isobutyl-1,3- propanediol; 2,2,4-trimethyl.1,6hexanediol 4,4'-sulfonyldiphenyl; 4,4'oxydiphenol; 4,4'-isopropylidenediphenol; 2,5-naphthalenediol; 2,2-dimethyl.1,3-propanediol; 2,2-diethyl-1,3-propanediol; 2-methyl-2-propyl-1,3-propanediol; 1,3-butanediol; 1,5-pentanediol; 2,2,4,4-tetramethyl-1,3-cyclobutanediol; o-, m-, and p-xylylene diols; and other well known polyester-forming diols.

In another preferred embodiment of the present invention, the diol component comprises a heteroatom-containing diol of the formula
HOCH$_2$CH$_2$XRXCH$_2$CH$_2$OH wherein X represents —O—, —S—, or

and R represents an aromatic moiety comprising 6 to 24 carbon atoms (e.g., 6 to 14 carbon atoms).

In those embodiments wherein the heteroatom-containing diol of the above formula is present in the polyesteramide, such diol may be present in an amount of at least about 10% by weight (e.g., about 10 to 100% by weight), based upon the total weight of the diol component.

In the above formula for the heteroatom-containing diol, X preferably represents —O—. Furthermore, R preferably represents a phenylene group. Thus, the heteroatom-containing diol preferably comprises 1,2-, 1,3-, or 1,4-bis(2-hydroxyethoxy)benzene, or a mixture thereof.

The polyesteramides further comprise a diacid component. The diacid component consists essentially of about 5 to 100 mol % of a first, heteroatom.containing dicarboxylic acid and 0 to about 95 mol % of a second dicarboxylic acid. The first dicarboxylic acid is of the formula HO$_2$CCH$_2$X(RX)$_y$CH$_2$CO$_2$H wherein X presents —O—, —S—, or

y is 0 or 1, and R represents an aromatic moiety comprising 6 to about 24 carbon atoms (e.g., 6 to about 14 carbon atoms).

Preferred examples of the first dicarboxylic acid include iminodiacetic acid, oxydiacetic acid, thiodiacetic acid, 1,4-phenylenedioxydiacetic acid, 1,3-phenylenedioxydiacetic acid, mixtures thereof, etc. Especially preferred as the first dicarboxylic acid are oxydiacetic acid, 1,3-phenylenedioxydiacetic acid, 1,4-phenylenedioxydiacetic acid, mixtures thereof, etc.

The second dicarboxylic acid contains up to 24 carbon atoms, preferably up to about 14 carbon atoms). Any of the well-known polyester or polyamide-forming diacids can be employed. Examples of particularly suitable acids include isophthalic acid, terephthalic acid, 1,4-cyclohexanedicarboxylic acid, sebacic acid, succinic acid, adipic acid, mixtures thereof, etc. Diacids which preferably are employed as the second dicarboxylic acid include isophthalic acid, adipic acid, mixtures thereof, etc.

The term "diacid" as used herein contemplates also the employment of corresponding esters, halides, anhydrides, etc., of the acids.

In the polyesteramides, the diamine component comprises about 10 to 90 mol % of the total of the diamine and diol components in the polyesteramide. Preferably, the diamine component comprises about 15 to 75 mol % (e.g., about 20 to 60 mol %) of the total of the diamine and diol components in the polyesteramide.

The polyesteramides are synthesized by methods generally known in the art for producing polyesteramides such as described in U.S. Pat. No. 4,501,879, incorporated herein by reference. Typically, stoichiometric quantities of the diacid and diamine components are combined with an excess of the diol component and a catalyst. The amount of the diol component present in the reaction mixture commonly will be in the range of about 5 to 300% by weight in excess of the stoichiometric quantity of diol. The diamine component can also be employed in excess if desired.

The polyesteramides which are employed exhibit an inherent viscosity (I.V.) of about 0.40 to 1.50. The I.V. is measured at 25° C in a 60/40 weight mixture of phenol/tetrachloroethane at a concentration of 0.5 grams per 100 ml. Polymers having an I.V. within the range specified above are of sufficiently high molecular weight to be used in the formation of the containers of the present invention.

Of course, suitable additives, such as dyes, pigments, plasticizers, fillers, antioxidants, stabilizers, etc., may be employed in conventional amounts. Such additives may be added directly to the reaction or may be added to the final polymer.

An especially preferred polyesteramide is derived from 1,3-phenylenedioxydiacetic acid, about 40-80 mol % ethylene glycol and about 60-20 mol % m-xylylenediamine.

Suitable equipment for melt blending polyester and polyesteramide includes the Werner and Pfleiderer, Brabender and Sterling extruders. Also, suitable equipment for pelletizing the blend includes a Cumberland rotary blade pelletizer.

Polyesters and polyesteramides are blended by using conventional melt blending equipment, preferably a single-screw extruder for blends used in coextrusion applications. Prior to melt blending, pellets of each are mixed, using about 15-70 wt % polyesteramide and about 85-30 wt % polyester. Pellets of the blend may then be coextruded with polyesters such as PET into sheets or coinjection molded with such polyesters into articles such as parisons for producing bottles. Also, multilayer pipe may be produced and then formed into preforms for producing bottles.

Suitable coextrusion equipment is commercially available and includes a coextrusion unit having a main 3¼ inch Prodex extruder and a 1¼ inch Prodex satellite extruder connected to a multilayer feedblock and die apparatus. The material may be coextruded in a conventional manner by coextruding through a series of plate dies to sequentially overcoat the appropriate materials in such a manner that the resulting structure is arranged in layers. Different relative extruder speeds and take-off rates permit a variety of different products to be made.

Suitable coinjection molding equipment is commercially available and includes the Nissei 250T coinjection machine.

Normally, in either coextrusion or coinjection molding, the polyester layer has a thickness of about 0.2-0.6 mm and the blend of polyester and polyesteramide has a thickness of about 0.06–0.18 mm. Articles such as bottles, jars, packaging, film, etc., have improved resistance to oxygen permeability. For example, typical 32 oz wide mouth bottles have an oxygen permeability or transmission rate of less than 65 to about $$500 \text{ amole/s} \cdot m \cdot Pa, \left(\text{i.e., } \frac{\text{attomole}}{\text{seconds} \cdot \text{meters} \cdot \text{pascal}}\right).$$

Although coextrusion of the structure is most preferred, one of the layers may be preformed and subsequently coated with the composition of the other layer(s) using conventional techniques.

As mentioned previously, the improvement in processing has been found to be related to the method of making the polyesteramide/polyester-melt blend for coextrusion applications. PET blends with polyesteramide compounded on a single screw extruder, such as a 0.75 in. Brabender extruder, have much less flow to the edge of a coextruded sheet when coextruded as the middle layer between layers of PET than a blend prepared on a twin screw extruder such as a 28 mm Werner and Pfleiderer extruder. Scanning electron microscopy (SEM) micrographs of blends prepared on a single screw extruder show that particles of the dispersed phase are generally in the shape of spheres from more than 1 micron to less than 15 microns in diameter. SEM micrographs of a blend made on a twin screw extruder show the dispersed phase more as oblong particles which on average are about 3 microns wide and up to about 18 microns long.

The following examples are submitted for a better understanding of the invention. The polyesteramide in each of the examples is that prepared using 1,3-pheylenedioxydiacetic acid, about 60-70 mol % ethylene glycol and about 40-30 mol % m-xylylenediamine.

EXAMPLE 1

A melt blend of poly(ethylene terephthalate) (I.V. 0.90 dL/g) with 20% polyesteramide is prepared on a Werner and Pfleiderer twin-screw extruder. Differential scanning calorimetry (DSC) curves of the blend when heated from about 0° C. to about 300° C. at a rate of 20° C./min., quenched to about 0° C. and reheated to about 300° C. at 20° C./min. show Tg values of about 50° C. and of about 75° C., a crystallization on heating value of about 135° C. and a melting point of about 235° C. A film compression molded at about 290° C. at about 20,000 psi and quenched in water at 23° C. is relatively clear. The blend is dried and used to prepare coinjected 32 oz jars on a Nissei 250T coinjection blow molding machine. The blend is used as the middle layer between layers of PET. The blend processes adequately to form jars with adhesion between the coinjected layers good enough to prevent separation of the layers even when the sidewalls of the container are flexed by hand. The jars are hazy even when coinjection temperatures of about 290° C. are used. The jars all have a haze reading of about 7% or greater as measured on a Gardner "Hazegard" instrument (ASTM method D1003). The haze measurement is the % of light which deviates more than 2.5 degrees when passing through the sample. This example demonstrates that a PET blend with polyesteramide while processing adequately, cannot be used to obtain clear containers. The haze in this example can be attributed to scattering of light due to incompatible particles of one polymer within the other after blending and subsequent processing.

EXAMPLE 2

A melt blend of about 75% poly(ethylene terephthalate) modified with about 30 mol % of cis/trans (30/70) 1,4 cyclohexanedimethanol, I.V. 0.75 dL/g with about 25% polyesteramide is prepared on a Werner and Pfleiderer twin screw extruder. DSC curves of the blend made in a manner similar to that given in Example 1 show Tg values of about 57° C. and of about 76° C. indicating that the blend is not thermodynamically miscible. No other peaks are seen. A compression molded film similar to the one in Example 1 is transparent, but contains more haze than the film in Example 1. The blend is dried and used to prepare 32 oz jars on a Nissei 250T coinjection blow molding machine as done in Example 1. The blend processes well to form the barrier layer between PET. When coinjection temperatures greater than about 275° C. are used, clear containers are produced with less than about 4% haze as measured by the method given in Example 1. The adhesion between the coinjected layers is as good as that obtained with the containers in Example 1. A container prepared with about 20% of the total thickness of the 32 oz jar as the barrier layer is found to have an oxygen transmission value of about 22 microliter/day (528 amole/s-Pa permeability rate). A jar of only PET has an oxygen transmission rate of 30 microliter/day (about 720 amole/s-Pa permeability rate).

EXAMPLE 3

A melt blend consisting of 37.5% PET, 37.5% PETG and 25% polyesteramide is prepared on a twin-screw extruder. DSC curves of the blend made in a similar manner to those given in Example 1 show Tg values of about 60° C. and of about 75° C. Crystallization on heating is about 176° C and the melting point is about 240° C. A compression molded film similar to the one in Example 1 is transparent, but contains more haze than the film in Example 1. The blend is dried and used to prepare 32 oz jars in a manner as given in Example 2. Clear containers with good adhesion are produced when coinjection temperatures of 275° C or greater are used, similar to the results seen in Example 2. A 32 oz jar prepared with this blend is tested for oxygen permeability and found to be similar to the one prepared with the blend in Example 2.

EXAMPLE 4

Polyesteramide is extruded at about 220° C. between layers of PET which are being extruded at about 280° C. The flow of the polyesteramide to the edge of the coextruded sheet is so severe that it sticks to the equipment rolls and prevents useful coextruded material from being processed. Two melt blends of PET with 40% polyesteramide are made. One is prepared at about 285° C. using a 0.75 inch Brabender extruder and the other is prepared at about 285° C. using a 28 mm Werner and Pfleiderer twin-screw extruder. The I.V. value of the blend prepared on the single-screw extruder is 0.64 dL/g and the I.V. value of the blend prepared on the twin-screw extruder is 0.69 dL/g. Coextrusion of the blends with PET at about 285° C on a Killion coextruded sheet line shows that the flow of the barrier blend to the edge of the sheet is significantly less with the blend made on the single screw extruder. This example demonstrates the improvement in processability that is realized when using polyester/polyesteramide blends and the preferred method of preparing the blend on a single screw rather than a twin screw extruder.

EXAMPLE 5

Trays are prepared from the coextruded sheet of Example 4 that gave the lower edge runout. The thickness of the sheet is about 20 mils, with about 12.6% of the thickness being the barrier layer. Oxygen transmission values for these trays are about 13.6 microliter/day (329 amole/s-Pa permeability rate). Trays composed of only PET about 25 mil thick are found to have oxygen transmission values of about 23 microliter/day (557 amole/s-Pa permeability rate). This example demonstrates the improvement in the barrier properties achieved with the use of blends as compared to using only PET for the tray material.

EXAMPLE 6

A melt blend of PET modified with about 30 mol % 1,4-cyclohexanedimethanol with 50% polyesteramide is prepared at about 230° C. on a single screw extruder like that given in Example 4. The material is coextruded with PET on a Killion coextrusion sheeting line as in Example 4 except that an extrusion temperature of about 205° C. is used for the barrier blend. The blend does not flow excessively to the edge of the sheet as did the blend prepared on a twin-screw extruder in Example 4. This example demonstrates that an amorphous polyester blended with polyesteramide can be used with a relatively low extrusion temperature to form an acceptable barrier layer for coextrusion sheeting. A melt blend of Merlon M40 polycarbonate with 50% polyesteramide prepared on a single-screw extruder at about 250° C. can only be coextruded on the Killion line at or above 230° C. and flows excessively to the edge of the coextruded sheet.

EXAMPLE 7

Polyesteramide is placed in a 70° C. oven for drying. After about 16 hours, the pellets are removed from the oven and are found to be fused together and not usable for normal processing such as feeding into extruders and molding equipment. PEA is dried at 45-50° C. in a forced air dryer and the pellets are found not to fuse together. The material requires greater than two weeks of drying and typically takes six to eight weeks at these conditions until the moisture level can be reduced to an acceptable level (>300 ppm water as measured on an AquaStar moisture titrator) for melt processing operations. This example demonstrates the difficulty of drying polyesteramide and the relatively long times and low temperatures that must be used to dry the polymer for normal processing. Polyesteramide is dried below $T_g$ and $T_g$ is □58° C.

EXAMPLE 8

A melt blend of 60% PET with 40% polyesteramide that has been pelletized is placed in an air dryer at a temperature of 70° C. to 90° C. After 24 to 48 hours at these conditions the pellets are free flowing and the moisture level is reduced to an acceptable level (<300 ppm water as measured on a AquaStar moisture titrator) for melt processing operations. Similarly good results are obtained with a melt blend of 75% PET with 25% polyesteramide or with a melt blend of 37.5% PET, 37.5% PET modified with 30 mol % 1,4-cyclohexanedimethanol, and 25% polyesteramide. Similarly good results are obtained when a melt blend of the same modified PET with 25% polyesteramide or with 50% polyesteramide is used except that a drying temperature of about 70° C. to about 80° C. is used.

Glass transition temperature ($T_g$), melting point (mp) and crystallization on heating value are measured by Differential Scanning Colorimetry (DSC) using conventional techniques.

Oxygen permeability or transmission rate is measured by determining the amount of oxygen that permeates through a test film of unit thickness and of a specified area in a unit of time at a particular partial pressure differential across the film. A MOCON permeability cell made by Modern Controls, Inc., can be used for permeability measurements. A MOCON instrument called OXTRAN can be used to specifically measure oxygen permeability.

Unless otherwise specified, all parts, percentages, ratios, etc., are on a weight basis.

The invention has been described in detail with particular reference to preferred embodiments thereof, but it will be understood that variations and modifications can be effected within the spirit and scope of the invention.

We claim:

1. A polymer blend comprising:
   about 15-70 wt. % polyesteramide which is the reaction product of
   (A) a diamine having 2 to 20 carbon atoms;
   (B) a diol containing up to 24 carbon atoms; and
   (C) a dicarboxylic acid component consisting essentially of
   (i) about 5 to 100 mole percent of a first, heteroatom-containing dicarboxylic acid of the formula $$HO_2CCH_2X(RX)_yCH_2CO_2H$$

wherein X represents —O—, —S—, or $$-\overset{\overset{\displaystyle H}{|}}{N}-$$

y is 0 or 1, and R represents an aromatic moiety comprising 6 to about 24 carbon atoms, and
   (ii) 0 to about 95 mole percent of a second dicarboxylic acid containing up to about 24 carbon atoms,
   wherein component (A) comprises about 10 to 90 mole percent of the total of components (A) and (B) in said polyesteramide, and
   II. about 85-30 wt. % poly(ethylene terephthalate) modified with about 20-40 mol % 1,4-cyclohexanedimethanol.

2. A polymer blend according to claim 1 wherein said polyesteramide contains repeating units from 1,3-phenylenedioxydiacetic acid, about 40-80 mol % ethylene glycol and about 60-20 mol % m-xylylenediamine.

3. A coextruded or coinjection molded article comprising a layer of the blend of claim 1.

4. The article according to claim 3 further comprising a layer of poly(ethylene terephthalate).